UNITED STATES PATENT OFFICE.

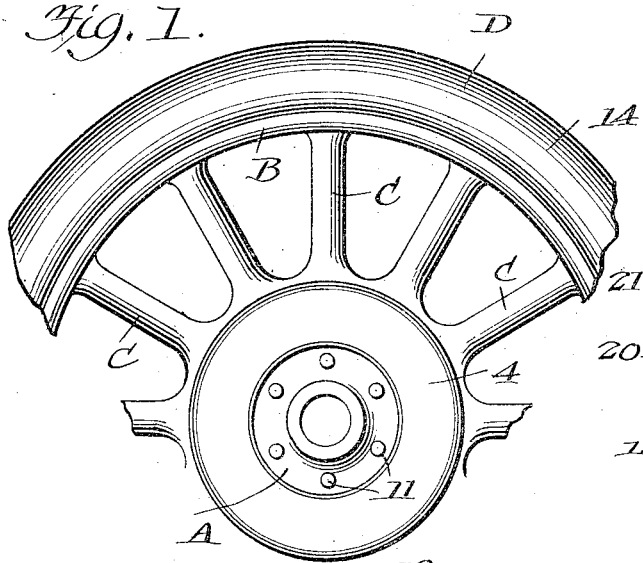
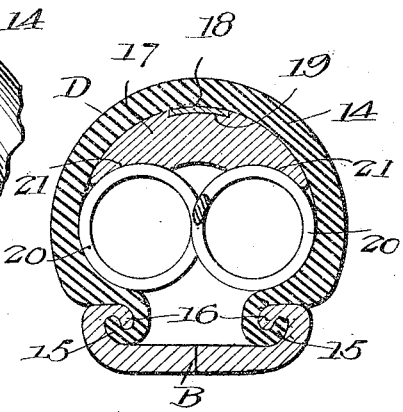
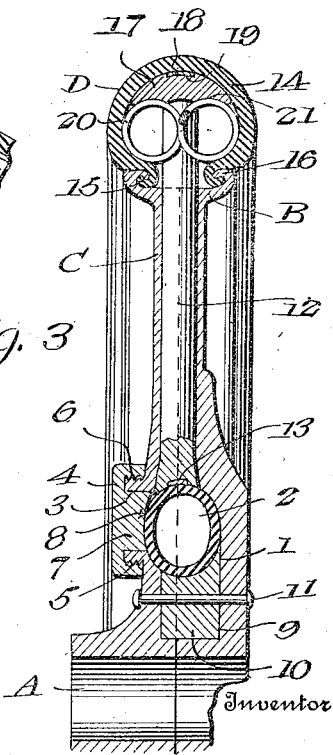

HENRY BOHNE, OF DODGE, NEBRASKA.

RESILIENT WHEEL.

1,279,234.    Specification of Letters Patent.    Patented Sept. 17, 1918.

Application filed August 10, 1917. Serial No. 185,575.

*To all whom it may concern:*

Be it known that I, HENRY BOHNE, a subject of the Emperor of Germany, residing at Dodge, in the county of Dodge and State of Nebraska, have invented new and useful Improvements in Resilient Wheels, of which the following is a specification.

This invention relates to resilient wheels, the object in view being to produce a wheel which will do away with the use of the present day pneumatic tire and the troubles incident to the use thereof, the wheel in its construction providing for the absorption of all ordinary road shocks and vibrations, preventing the same from being communicated to the axle, running gear and body of the vehicle.

With the above and other objects in view, the invention consists in the novel construction, combination and arrangement of parts, as herein described, illustrated and claimed.

In the accompanying drawings:—

Figure 1 is a side elevation of a portion of a vehicle wheel embodying the present invention.

Fig. 2 is a vertical circumferential section through the same at a right angle to the bore of the hub.

Fig. 3 is a radial section through the wheel taken centrally of one of the spokes.

Fig. 4 is an enlarged cross section through the rim and flexible tire.

The resilient wheel contemplated in this invention comprises a hub designated generally at A, a rim B and tubular spokes C which have a rigid connection at their opposide extremities with said hub and rim.

The hub A is channeled as indicated at 1 to receive an inflatable compressed air holding tube 2, said channel being formed with an annular lateral or side opening 3 to allow for the insertion and removal of the tube 2. When the tube is in place as shown in Fig. 3, a casing plate 4 covers the annular side opening 3 and is shown as held in place by providing said plate 4 with internal threads 5 which engage corresponding threads on a shoulder 6 of the hub A all as clearly shown in Fig. 3. The casing plate 4 is also provided on its inner side with an annular abutment 7 having a concaved inner face 8 forming a seat for the adjacent side of the tube 2. The channel which receives the tube 2 is extended inwardly as shown at 9 to receive an annular tube support 10 of wood or similar material around which the tube 2 extends and upon which it is supported. The support 10 is held in place by bolts 11 or the equivalent thereof.

D designates generally a flexible tire which is supported and carried by the outer extremities of a series of inner spokes or plungers 12, said spokes being arranged to slide within the outer tubular spokes C and the inner ends of said inner spokes being connected by a spring metal hoop 13 having a concaved inner face which lies directly in contact with the compressed air tube 2. Therefore, each of the spokes 12 may be said to be independently supported by the compressed air tube so as to permit the same to slide inwardly when the tire flexes under the action of the load imposed thereon or when subjected to road shocks.

The tire D comprises an outer shoe 14 of flexible material such as rubber, leather, canvas or a fabric containing rubber, canvas or the like, said shoe 14 being provided along its marginal edges with hook like flanges 15 which engage corresponding flanges 16 at opposite sides of the rim B as shown in Fig. 4. 17 designates a flexible distending hoop or saddle for the outer shoe 14. Furthermore, said hoop may be of any desired material, preferably wood which will easily flex and impart the necessary resiliency to the tire. 18 designates an endless restraining spring metal hoop which encircles the hoop 17 and reinforces the same. The hoop 17 is preferably recessed as shown at 19 to permit the hoop 18 to set flush therein. Helical springs 20 are arranged within the outer shoe 14, the same extending circumferentially of the tire and being formed to provide two circular series of convolutions side by side as shown in Fig. 4. The springs 20 press outwardly against the inside surfaces of the side walls of the outer shoe 14 and also press outwardly against the flexible distending hoop 17, the latter being preferably formed with annular concaved seats 21 for the springs 20 so as to insure the proper retention of all parts of the flexible tire in proper relation to each other.

From the foregoing description taken in connection with the accompanying drawings, it will now be seen that the wheel embodies what may be called a rigid section and a yielding section, the rigid section being formed by the hub A, rim B and spokes C and the yielding or shock absorbing section thereof being formed by the flexible tire, the inner spokes or flanges 12 and the compressed air tube 2. The rigid section of the wheel taken in conjunction with the inside spokes or plungers 12 provide for driving all parts of the wheel in unison while maintaining the movable parts thereof in operative condition and relation to each other. The flexible tire is supported at various points by the spokes or plungers 12 each of whch is adapted to yield independently of the remainder. Thus the ordinary road shocks and vibrations are taken care of while at the same time obtaining a wheel structure which is sufficiently strong and well braced to withstand all ordinary road usage.

What I claim is:—

In a resilient wheel, the combination of a hub, a tire carrying rim, tubular spokes having a fixed connection at the opposite extremities thereof with said hub and rim, said hub being formed with an annular channel intersected by the bores of all of said spokes and having an annular opening in the side thereof, concentric annular shoulders at opposite sides of said annular opening threaded on their opposite faces, an endless compressed air tube in said channel, a removable annular casing plate covering said annular side opening and having annular internally threaded flanges engaging said threaded shoulders, a flexible tire, and plunger spokes interposed between said tire and air tube and slidable in said tubular spokes.

In testimony whereof I affix my signature.

HENRY BOHNE.

Copies of this patent may be obtained for five cents each, by addressing the "Commissioner of Patents, Washington, D. C."